April 7, 1970   D. M. SOWARDS   3,505,030
COMPOSITE ARTICLES OF MANUFACTURE AND APPARATUS FOR THEIR USE
Filed Nov. 16, 1965

INVENTOR
DONALD MAURICE SOWARDS

BY

AGENT

United States Patent Office 3,505,030
Patented Apr. 7, 1970

3,505,030
COMPOSITE ARTICLES OF MANUFACTURE AND APPARATUS FOR THEIR USE
Donald Maurice Sowards, Claymont, Del., assignor to E. I. du Pont de Nemours and Company, Wilmington, Del., a corporation of Delaware
Filed Nov. 16, 1965, Ser. No. 508,074
Int. Cl. B01j 7/00, 9/04
U.S. Cl. 23—288          6 Claims

ABSTRACT OF THE DISCLOSURE

Special configuration of honeycomb materials are useful as supports for catalyst gauzes. One configuration involves providing grooves in one of the surfaces open to the honeycomb cells. In another configuration, a composite support is made by combining a straight cell honeycomb with a slant cell honeycomb.

---

This invention relates to ceramic honeycomb structures. The invention is particularly directed to a straight-cell ceramic honeycomb structure in which one face perpendicular to the longitudinal axes of the honeycomb cells contains at least one lateral groove such that all or substantially all of the honeycomb cells communicate with a groove. The invention is further particularly directed to a composite of a straight-cell honeycomb in contact with a slant-cell honeycomb structure, the surfaces in contact being planar and being penetrated by honeycomb cells. The invention is also directed to such a composite in which the surface of the straight-cell honeycomb structure which is parallel and opposite to the surface in contact with the slant-cell honeycomb contains at least one lateral groove such that all or substantially all of the honeycomb cells communicate with a groove.

By "straight-cell" honeycomb structure is meant one in which the longitudinal axes of the open-ended honeycomb cells are perpendicular to two parallel planar surfaces of the structure. The exterior shape of the structure will usually be that of a right parallelepiped or right cylinder, but it will be understood that any other solid shape having two parallel planar surfaces, such as a right triangular prism, is within the scope of the term.

By "slant-cell" honeycomb structure is meant one in which the longitudinal axes of the open-ended honeycomb cells form oblique angles with two parallel planar surfaces of the structure. The exterior shape of the structure will usually be that of a right or oblique parallelepiped or right or oblique cylinder but it will be understood that any other solid shape having two parallel planar surfaces is contemplated.

In another aspect the invention relates to a reactor and more particularly to a reactor for carrying out gas phase reactions comprising a vessel containing a catalyst gauze pack supported directly upon a novel ceramic honeycomb structure of this invention.

The invention will be better understood by reference to the drawings.

Figure 4:
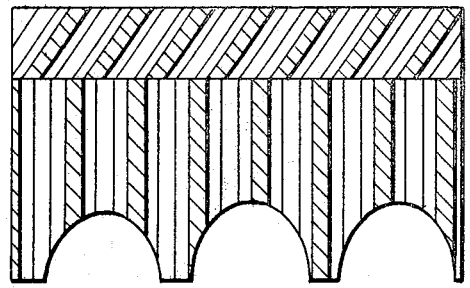
FIG. 4 is an elevation and section of a composite straight-cell/slant-cell honeycomb structure of this invention wherein the surface of the straight-cell structure which is opposite to the surface in contact with the slant-cell structure contains a series of parallel lateral grooves such that each cell communicates with a groove.
Figure 5:
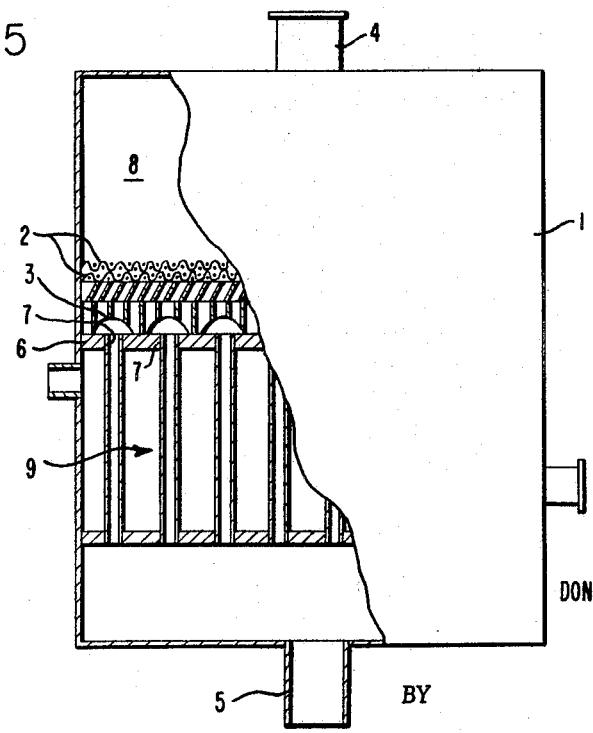

FIG. 5 is a diagrammatic elevation view partly in section of a catalytic reactor for carrying out gas phase reactions comprising a vessel 1 containing a catalyst gauze pack 2 supported directly upon ceramic honeycomb structure 3 of the type depicted in FIG. 4.

In the manufacture of hydrogen cyanide by reaction of air, natural gas (methane) and ammonia, a reaction vessel similar to that shown in FIG. 5 is used. The vessel comprises a generally cylindrical vertically-placed tank 1 usually of about 2–6 feet in diameter having an inlet opening 4 in the upper portion and an outlet opening 5 in the lower portion. A horizontally-placed divider 6 is located between the openings. The divider has a plurality of vertical channels 7 for effluence of reacted gases. A horizontal catalyst gauze pack 2 is supported ultimately by the divider 6 and directly by a ceramic honeycomb structure 3. For simplicity the gauze pack is shown in the drawing as only two screens, but in practice the pack consists ordinarily of from ten to fifty platinum screens of approximately 80 mesh placed one on top of the other.

Above the gauze pack and below the inlet opening is a chamber 8. In this chamber the incoming gases are thoroughly distributed to provide uniform composition and temperature. The gases are then passed through the gauze pack. The reaction is exothermic and self-sustaining after ignition, and causes the temperature of the gauze pack to rise to 1100–1200° C. under optimum conditions. Higher temperatures are undesirable because of the unfavorable equilibrium composition of the reacting gases. As the gases leave the gauze pack they are rapidly quenched by passing them through a cooler or waste heat boiler which can consist of a shell and tube heat exchanger 9. The divider 6 can conveniently consist of the tube sheet of the heat exchanger, as illustrated in FIG. 5. The reacted gases of course pass through the tube side and water is passed through the shell side of the exchanger. The gases are cooled in passing through the tubes to a temperature of about 60–300° C.

Since the catalyst gauze is very weak a mechanical support is required. In present practice, the gauze pack is supported directly by the tube sheet or a refractory plate placed between the tube sheet and the gauze and having holes corresponding to the holes in the tube sheet. More frequently the gauze is supported directly upon vertically placed ceramic drip tile or on horizontally-placed ceramic rods, and these suport materials in turn rest on the tube sheet of refractory plate. A bed of randomly-disposed chunks of refractory ceramic material is also frequently used to support the gauze. The chunks are normally graded in size, those on the top of the support bed and nearest the gauze being small, say about ⅛" in diameter, and those on the bottom being larger, say about ⅝" or larger in diameter, so that they will not pass through the holes in the tube sheet or refractory plate. Combinations of these support materials, e.g. refractory granules above ceramic drip tile, are also frequently used.

These conventional support materials occupy up to 50% or more of the cross-sectional area perpendicular to the flow of gases; hence, pressure drop through the reactor is raised substantially and gas throughput is decreased on account of the necessity of a support. Moreover, the portion of the gauzes in contact with the support material is not available for reaction, since gases cannot flow through the gauzes at this point. Consequently, the total effectivness of the catalyst is not realized and, perhaps even more important, life of the expensive platinum catalyst is adversely affected due to the existence of "cold spots" in areas where no reaction is taking place. These latter problems are of course more acute where the gauze rests on the tube-sheet, refractory plate, drip tile or rods than where it rests directly upon rather finely divided granules of refractory material. A bed of granular material however, increases pressure drop and creates other troublesome problems, such as the finer particles on top sifting down through the bed and even through the exchanger tubes. Ordinarily a bed of granular material must be replaced whenever the catalyst is replaced.

A further difficulty experienced in supporting the gauze pack directly on the tube sheet or refractory plate or on drip tile or rods is that, due to the inadequate distribution of solid-supporting area, the gauze deforms into the open spaces. The gauze pack is ordinarily sealed at the perimeter of the vessel. Deformation can cause the gauze to pull out of this seal or result in tearing of the gauze. Since pressure drop through the gauze packs is appreciable, any break in the seal or gauze results in a large amount of the reactants by-passing the catalyst completely, and thus not reacting.

A still further disadvantage of the conventional support materials is that the gauze is placed too far away from the cooler tubes. If the gases after passing through the catalyst are not quenched immediately the yield of the desired HCN is decreased.

According to this invention it has been found that ceramic honeycomb structures make ideal support material for catalyst gauzes in gas phase reactors such as those used in manufacture of HCN. By proper combination of honeycomb cell size and wall thickness, the distribution of open area for fluid flow and solid supporting area for load support can be optimized. Thus pressure drop and gauze deformation can be minimized. Further, the thickness of the honeycomb support structure can be chosen to place the gauze as close as possible to the heat exchanger and yet ensure that the exiting gases have a high degree of laminar flow, thus permitting attainment of the most favorable equilibrium composition. For example, in the manufacture of HCN using a platinum —20 rhodium gauze pack consisting of ten 80 mesh screens, a 1" to 3" thick honeycomb having 3/16" nominal diameter cells and 30–50 mil thick walls gives excellent results. A 1/4" diameter cell permits gauze deformation, whereas a 1/8" cell affords less open area. The optimum cell and wall size of course will vary with the type of catalyst, the surface area requirements and the permissible pressure drop.

In addition it has been found that further operating advantages can be achieved by use of the novel honeycomb structure of this invention as catalyst gauze supports. Thus, a ceramic honeycomb structure such as that depicted in FIGS. 1 and 2 in which the bottom surface is grooved so that all cells communicate with a groove can be placed directly on the tube sheet or refractory plate or other multi-channel divider and support plate. It will be observed that regardless of how such a grooved honeycomb structure is placed on a surface no honeycomb cell is blocked by the surface. Thus fluids can flow freely through all cells. Consequently presure drop through the support is markedly reduced. Further, substantially the entire area of a catalyst gauze supported on such a grooved structure is effectively used and "cold spots" or "dead spots" in the gauze are eliminated resulting in increased catalyst life.

Figure 3:
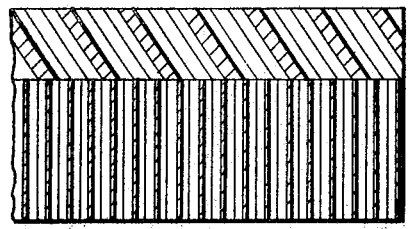
FIG. 3 is an elevation in section of a composite straight-cell/slant-cell honeycomb structure of the invention.

Further operational improvements are noted in using a support material consisting of a composite straight-cell/slant-cell honeycomb structure as illustrated in FIG. 3. The purpose of the composite is to provide for thermal radiation shielding of the heat exchanger tubes from the hot platinum gauze. The gauze is preferably placed on the upper surface of the slant-cell section. As will be readily apparent, the angle of the slant cells and the thickness of the straight- and slant-cell sections can be selected to block the line-of-sight of the gauze to the tube sheet below. Radiative transfer adversely affects operation by (1) cooling the portion of the gauze which can "see" cool surfaces and (2) corresponding overheating of the portion of the tube sheet and tubes which the gauze can "see."

The advantages of both the grooved-bottom honeycomb and the composite slant-cell/straight-cell honeycomb can of course be realized by using a composite such as that depicted in FIG. 4 and shown in a reactor in FIG. 5 in which the surface of the straight-cell section which is opposite to the surface in contact with the slant-cell section is grooved in the manner described. It is reiterated that the illustration and description of the HCN reactor given herein has been highly simplified for the purpose of more clearly pointing out the invention. For a more detailed description of a HCN converter of the type described reference can be had to Inman U.S. Patent 2,782,107, issued Feb. 19, 1957.

Figure 1:
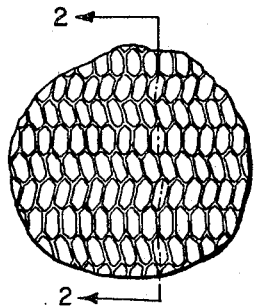
FIGS. 1 and 2 are top view and elevation in section, respectively, of a straight cell ceramic honeycomb structure of this invention in which one surface perpendicular to the honeycomb cell walls contains a series of parallel lateral grooves spaced apart such that each cell communicates with a groove.
Figure 2:
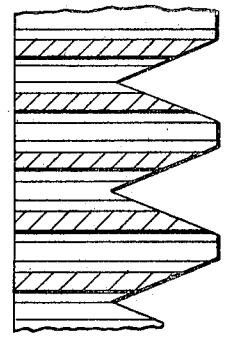

Although the invention has been described thus far with particular emphasis on the use of ceramic honeycomb as catalyst support structures in HCN converters, it will be understood that the invention is broadly applicable to any type reactor where low pressure drop and distribution of load support area are important. For example, the novel honeycomb structures can be used as catalyst supports to great advantage in the partial oxidation of methanol to form formaldehyde. In this reaction, as in the case of HCN manufacture, rapid quenching of reaction heat is of primary importance in inhibiting complete oxidation to undesired side products. Temperature quenching is normally carried out by placing the catalyst, a silver gauze pack, on a multi-hole water cooled copper block below which cooling continues in a water-steam tube-type heat exchanger. By supporting the silver catalyst on a ceramic honeycomb structure as depicted in FIGURES 1 and 2 which is in turn supported by the heat exchanger, improvements similar to those described in connection with HCN manufacture can be obtained.

Another example of a reaction in which ceramic honeycomb can be used as catalyst support is the oxidation of ammonia to form nitric acid.

Methods for making ceramic honeycomb are well known. These will be mentioned and described briefly. No extended discussion is necessary since those skilled in the art are already familiar with the procedures.

U.S. Patent 3,112,184 issued Nov. 26, 1963, to Hollenbach describes a method for making ceramic honeycomb. A suspension containing a finely divided sinterable ceramic material and a binding agent is applied to each side of a flexible carrier. The coated carrier is then corrugated and formed into a honeycomb. According to the disclosure, the carrier is preferably an organic fibrous material which will decompose under the conditions of sintering, but inorganic carriers can also be used. Also according to the disclosure, the method can be used to produce honeycomb of virtually any ceramic material; examples include glasses such as boro-silicates, soda-lime-silicates, lead silicates, alumino-silicates, and refractories such as sillimanite, magnesium silicate, magnesia, zircon, zirconia, petalite, spodumene, cordierite, corundum, and the glass ceramics.

British Patent 931,096 published July 10, 1963, discloses a similar method for making honeycomb wherein flexible sheets containing sinterable ceramic particles are formed and corrugated, two or more such corrugated sheets are placed node to node, and the assembly is fired to sinter the ceramic particles and weld the sheets at points of contact. As a variation, alternate sheets of ceramic can be noncorrugated. The sheets are made by mixing the ceramic particles with plasticizing ingredients such as organic polymers and forming the mix into thin films. The film is preferably formed on a carrier such as a thin metal foil which provides support during corrugation. After corrugation, the green film is removed from the support and is used in making a honeycomb structure. The structure is then fired to sinter the ceramic particles, resulting in a rigid honeycomb. This method, according to the disclosure, is also applicable to a wide range of sinterable ceramic materials.

Belgian Patent 612,535, issued July 11, 1962, discloses a particularly suitable method for making the honeycomb structures of this invention. In this method aluminum foil is fabricated into a honeycomb structure of the desired shape and is fired under controlled conditions to oxidize the aluminum to $\alpha$-alumina. Prior to the firing step the aluminum foil is coated with an agent, identified in the patent as a fluxing agent, which serves to prevent inhibition of oxidation due to oxide scum formation on the surface of the aluminum. Examples of fluxing agents disclosed in the patent as being suitable include alkali metal and alkaline earth metal oxides and precursors of these oxides, i.e. compounds which yield the oxides on firing. A particularly suitable agent is sodium oxide which is applied as sodium silicate.

The honeycomb products resulting from this process are substantially pure $\alpha$-alumina. If desired, the chemical composition of the structures can be modified by including in the coating composition finely divided particles of filler refractory oxide. The filler refractories may if desired, be one or more of those which will react with the alumina as it is formed. If a reactive filler such as magnesia and/or silica is used, the honeycomb structure will contain the corresponding reaction product such as spinel, cordierite or mullite. The products of this process are characterized by outstanding strength and thermal shock resistance.

As disclosed in Belgian Patent 612,535 the honeycomb structures may be fabricated by corrugating sheets of aluminum foil coated with fluxing agent and placing the coated sheets together node to node. Where sodium silicate solution is used as the fluxing agent, the body will have sufficient green strength to maintain its shape until it is fired. Alternatively the honeycomb structure may first be fabricated from the aluminum foil using methods well known in the art and described in the patent literature. For general disclosure on the art of making honeycomb, reference is made to U.S. Patent Nos. 2,610,934, 2,674,295, and 2,734,843. For instruction on making slant-cell honeycomb, reference is made to U.S. Patent No. 3,006,798. Suitable prefabricated aluminum honeycomb structures for use in this process are available commercially and may be purchased from Hexcel Corporation of Bloomingdale Rubber Division of American Cyanamid, both of Havre de Grace, Md. Structures with nominal cell sizes ranging from 1/8" up to 3/4" and foil thicknesses of 0.7 mil to 7 mils are readily available. Other sizes with cells ranging from say 1/32" up to 2" or higher and with foil up to 1/4" in thickness can be made and used in the process disclosed in the Belgian patent. The preferred structures are prepared using foil of about 2 mils thick.

An improvement in the process for making honeycomb structures by the method of the Belgian patent is disclosed in copending U.S. application S.N. 367,856 filed May 15, 1964, now abandoned. In the process of this application the composition used to coat the aluminum honeycomb structure contains, in addition to the fluxing agent and filler refractory, if any, small amounts of a vanadium compound. The products of the Belgian patent are characterized by having a double-walled structure. The double wall results from the fact that the aluminum foil, as it melts, flows outwardly through the oxide formed on the outer surfaces of the foil and is oxidized at the outer surface of the oxide layer, thus leaving a large void in the final product corresponding approximately in thickness to the thickness of the original aluminum foil. The inclusion of the vanadium compound in the coating composition causes the formation of bridges of refractory material between these double walls, resulting in a product having even greater strength and thermal shock resistance than the products of the Belgian patent.

A further improvement in the process of the Belgian patent is disclosed in copending U.S. application S.N. 471,739, filed July 13, 1965. In the process of this application, the composition used to coat the aluminum honeycomb structure contains aluminum powder in addition to the fluxing agent and filler refractory, if any. The aluminum powder, of course, is oxidized to alumina during firing along with the aluminum in the original metal honeycomb. This method provides structures which are similar to those of the Belgian patent in that they are double-walled, but the walls can be made much thicker than the central void. Thus, the products are stronger than those of the Belgian patent.

A particularly preferred method for making mullite honeycomb is disclosed in copending application S.N. 449,629, filed Apr. 20, 1965, now abandoned. The method is similar to that disclosed in S.N. 471,738, but silicon carbide is added to the composition used to coat the aluminum metal honeycomb. Upon firing the SiC reacts with the aluminum to provide mullite. Mullite structures are particularly preferred as catalyst carriers because of their low thermal expansion.

A further suitable method for making ceramic honeycomb is disclosed in copending application S.N. 336,983, filed Jan. 10, 1964, now U.S. Patent 3,338,995 to Sowards. In this method a "fugitive" material, e.g. paper, is coated with a composition including aluminum powder, a binder, a fluxing agent (of the type disclosed in the Belgian patent) and a liquid carrier. The "fugitive" material may be first coated then used to fabricate a honeycomb, or the honeycomb may be first fabricated from the fugitive material then coated. In either case, the coated structure is fired in oxygen to burn out the fugitive material and oxidize the aluminum. Filler refractories can of course be included in the coating compositions to provide ceramics including compounds and/or solid solutions of alumina with other oxides.

The novel honeycomb structures of this invention can be made by any of the above methods either by using a template structure having the configuration of the desired final product, or by first making a ceramic honeycomb and then cutting it to the desired shape.

Since aluminum honeycomb is easily carved and shaped, the preferred method is to provide an aluminum honeycomb structure of the desired configuration, coat it with a slurry containing a fluxing agent, then fire it to oxidize the aluminum. The most convenient method for making a grooved bottom honeycomb section is to die-cut holes in a section of unexpanded aluminum honeycomb in which the dimension in the direction of the cell axes is twice as great as that desired in the final product. The holes should be cut perpendicular to the cell walls such that their centers fall on a line which bisects all of the cells. Preferably, the holes are spaced about 1/2 to 1 1/2 cell diameters apart so that all or substantially all of the cells communicate with a hole. For example, if a 3/16" cell honeycomb made of 2 mil thick foil is cut to form a series of 1" diameter circular holes on 1 1/4" centers, then regardless of how the first hole is placed, all cells in the unexpanded honeycomb will have access to a hole.

After the holes have been punched, and before expansion, the section is cut into two sections along the line bisecting the cell axes. The separate sections can then be expanded, coated and fired. If circular holes are cut in the unexpanded section, the completed section will have a shape such as that illustrated by the straight-cell section in the composite of FIG. 3. It will be observed that the grooves are slightly hyperbolic, due to extortion of the circles upon expansion of the honeycomb.

Of course, many variations of the above procedure for making a grooved-bottom section are possible. A section such as that shown in FIG. 1, for example, was made by cutting 7/8" equilateral triangles with a distance between vertices of 1″ out of an unexpanded section of ⅜₁₆″ honeycomb having a dimension in the direction of the cells of 1½″. Upon expansion, the triangles were distorted slightly so that the length of the base of the triangular grooves is slightly less than the length of the sides. The grooves may of course be rectangular in shape with equivalent results.

Although die-cutting of the unexpanded section of aluminum honeycomb is the preferred method, the grooves can also be cut in either the expanded or unexpanded sections using other conventional honeycomb cutting techniques. As described in bulletin TSB 117 of Hexcel Products, Inc., published July 1, 1962, and entitled "Carving and Forming Honeycomb Materials," these techniques include cutting with a bread knife or similar sharp instrument or sawing with a rotary blade or band saw. Expanded sections can be die-cut, but this is not very successful when cutting in a direction perpendicular to the honeycomb cells. When sawing an aluminum honeycomb, damage to the cell walls is minimized by using a reverse-toothed saw.

The slurry used to coat the aluminum honeycomb will in the preferred practice contain a fluxing agent such as sodium silicate, aluminum powder, water, a binding agent such as carboxymethyl cellulose, and, optionally, finely divided filler refractory. In drying, heat setting, and firing a coated, grooved honeycomb it has been found good practice to support the structure with the grooved surface upward, since there is some wicking action of the coating observed. If the grooved surface is upward, this action serves to reinforce the ridges formed by the grooves.

Of course, it is also possible to first form the ceramic honeycomb in the normal way using any one of the several methods previously mentioned and subsequently, using a diamond saw, cut the grooves in the ceramic. Also, holes or grooves can be cut in the ceramic honeycomb using a diamond-toothed trepan.

For making a slant-cell/straight-cell composite, slant-cell aluminum honeycomb, which can be made as described in U.S. Patent 3,006,798, is coated with a fluxing agent and fired according to methods discussed previously. Alternatively, but less desirably, a large rectangular block of straight-cell ceramic honeycomb can first be made, and then a slant-cell section can be cut from it using, of course, a diamond-toothed saw. The cut is made along diagonal lines oblique to the axes of the cells of the honeycomb.

For ease in handling, shipping, and installing, it is preferred that the slant-cell and straight-cell honeycomb sections of the composite of this invention be joined to form an integral structure. Joining of the sections can obviously be accomplished in many ways. An extremely simple manner when making the individual sections by the aluminum honeycomb oxidation route is to place the coated unfired sections in contact and cover the surfaces at the juncture of the two sections with additional coating composition. When fired, a good bond between the sections is obtained.

The ceramic honeycomb structures of this invention can have nominal cell diameters in the range of about 1⁄32″ to about 2″, with cell walls ranging from 5 mils to 200 mils or more. In the preferred structures, cell diameters are in the range 1⁄16″ to ¾″ and cell walls range from 10 to 100 mils. As stated above, for use in an HCN converter a structure having nominal 3⁄16″ cells and 30–50 mil thick wall is preferred. The percent open area of the structures perpendicular to the flow of fluid should be between 20 and 95%, and preferably between about 50% and 90%. Thickness of the honeycomb sections in the direction of the cell axes will vary widely depending upon the application; normally, in the HCN converter overall thickness of the support will range between about 1″ and 3″. It will be understood of course that these are merely optimum limits, and that theoretically the structures can be made in vertually any thickness. As a practical matter, thicknesses in the range of about ⅛″ to about 13″ more often between about ½″ and 6″ will be used as catalyst supports.

The invention will be further described by the following illustrative examples, wherein proportions of materials are by weight unless otherwise specified.

EXAMPLE 1

A section of aluminum honeycomb before expansion (HOBE) 1½″ thick made of 0.001″ aluminum foil was obtained from Hexcel Corporation, Havre de Grace, Md. One inch equilateral triangular grooves perpendicular to the foil direction and on 1¼″ spacing were cut into one of the faces perpendicular to the foil sheets. The HOBE sheet was then expanded to form aluminum honeycomb with 3⁄16″ cell diameter. In the resulting sheets, one face perpendicular to the cell axes was grooved with triangular grooves 1″ deep by about 15⁄16″ wide at the base on 1 1⁄16″ centers. All cells communicated with a groove. From this grooved sheet a square piece approximately 15″ x 15″ was cut and etched for six minutes in 1% aqueous sodium hydroxide at about 35° C. The honeycomb was thoroughly rinsed with water, drained, and dried. The weight of the etched aluminum honeycomb was 219 grams.

The etched aluminum honeycomb was then coated by immersing in a slurry consisting of:

1 part by weight of a 1% aqueous solution of carboxymethylcellulose, type 7HS, obtained from Hercules Powder Company;
1 part by weight of 41° Bé. sodium silicate solution with $Na_2O \cdot SiO_2$ of 1:3.25;
0.25 part by weight of water;
0.50 part by weight of 325 mesh aluminum powder, 123, obtained from Aluminum Company of America;
0.70 part by weight of 100 mesh calcined alumina, A–5, obtained from Alcoa;
1.50 parts by weight of —325 mesh silicon carbide obtained from Carborundum Company;
0.50 part by weight of —325 mesh bonding clay obtained from Cedar Heights Clay Company, Oak Hill, Ohio.

After draining and drying, the coated aluminum honeycomb was heat set between platens heated to 150° C. under pressure just sufficient to remove warpage (about 5 p.s.i.) for three minutes. The coated honeycomb weighed 1460 grams.

From the coated honeycomb a 13⅞″ diameter circle was cut by band sawing which weighed 1105 grams. The honeycomb disk was then coated a second time by immersing in the slurry described above. After draining, drying, and heat setting as above, the disk weighed 1724 grams.

The disk was then fired in a gas-fired kiln in a firing cycle:

| Time (hrs.): | Temperature (° C.) |
| --- | --- |
| 18 | 200–600 |
| 4 | 600–800 |
| 21 | 800–1000 |
| 13 | 1000–1200 |
| 8 | 1200–1400 |
| 17 | 1400–1560 |
| 4 | 1560 hold |

After cooling to room temperature in 48 hours, the fired product weighed 2002 grams and was translucent grayish white in color with darker gray areas in the walls of the cells.

EXAMPLE 2

A section of 1½″ thick HOBE sheet made of 5052 aluminum alloy 0.001″ foil and assembled so that 3⁄16″ diameter cells would result after expansion was machined by the supplier, Hexcel Corporation, as follows: into one face perpendicular to the foil, semicircular grooves ½″ in radius were milled on 1¼″ spacings and in a direction perpendicular to the foil direction of the HOBE sheet. The HOBE sheet was then cut into 16″ wide pieces, the cuts being parallel to the milled grooves and hand expanded to form the 3/16" diameter cells. These expanded aluminum honeycomb pieces were then cut into 12" x 12" square pieces.

Aluminum honeycomb, 12" x 12" x 1/2", 3/16" diameter cell, made of 0.002" thick foil of 5052 alloy with the axes of the cells at a 45° angle to the opposed faces was obtained from American Cyanamid Company, Bloomingdale Division, Havre de Grace, Md.

Both the grooved 12" x 12" x 1 1/2" aluminum honeycomb and the 12" x 12" x 1/2" slant cell piece were etched for three minutes in a 1% aqueous sodium hydroxide solution at about 35° C., thoroughly water rinsed, drained, and dried.

The etched aluminum honeycomb was then coated by immersing separately into a slurry consisting of:

1 part by weight of a 1% aqueous solution of carboxymethylcellulose, type 7HS, obtained from Hercules Powder Company;
1 part by weight of 41° Bé. solution of sodium silicate, $Na_2O:SiO_2$ of 1:3.25;
0.7 part by weight of calcined alumina, A–5;
1.0 part by weight of aluminum powder, 123.

The pieces were drained, dried, and heat set under 5 p.s.i. loan between platens heated to 150° C. for three minutes to remove any warpage in the pieces.

The coated and heat set pieces were then cut to size by using a band saw as follows:

|  | Dimensions, circles | |
|---|---|---|
|  | In foil direction | Perpendicular to foil direction |
| Grooved straight cell | 11.8 | 11.5 |
| Slant cell | 11.5 | 11.8 |

The pieces were then separately coated a second time by immersing in the slurry, drained, and allowed to dry until the slurry was tacky. The pieces were placed togeter face to face with the grooves of the straight cell section on the face opposite to that in contact with the slant cell piece so that the dimensions corresponded and then heat set under 5 p.s.i. load between platens heated to 150° C. for five minutes. The two pieces were lightly cemented to form a composite piece—a slant cell section and a straight section. In order to improve the adherence for further handling, additional slurry was applied by bushing a 1/32" thick layer of the slurry around the perimeter of the composite pieces. The coating was dried by placing the composite into an air oven at 50° C. for about 16 hours. After removal from the oven, the edges of the composite were dressed smooth with a band saw to maintain the 11.8" x 11.5" dimensions.

The composite piece was then fired in a gas-fired kiln with the slant cell side down according to the schedule of Example 1.

The fired piece, a unitary composite, 12" x 12" x 2" thick, was pink in color, and weighed 1600 grams.

EXAMPLE 3

A 6" x 6" x 2" piece of Alsimag 769, 4 1/2 cells per inch "split cell" "Thermacomb" corrugated ceramic with the axes of the cells parallel to the 2" direction was obtained from the American Lava Corporaiton, Chattanooga, Tenn., a subsidiary of Minnesota Mining and Manufacturing Company. The split cell "Thermacomb" products are made up of an alternating series of corrugated and flat webs of ceramic which are bonded together by sintering at points of contact between the corrugated and flat webs as described in British Patent 913,096. A series of parallel holes were cut with a 11" O.D. hole saw along a line midway between (or 1 inch from) the 6" x 6" parallel faces of the "Thermacomb" block. The holes were spaced on 1.25" centers and were perpendicular to the flat webs. The drilled block was then cut into two halves by sawing along the plane containing the center lines of the holes. This plane was parallel to and located 1" from each 6" x 6" face of the honeycomb. Two pieces of ceramic "honeycomb" each with parallel semicircular grooves resulted. However, due to fragility and brittleness of the structure, the largest piece recovered from the process was about 6" x 3.5" x 0.95" thick. The amount of material removed by the sawing operation resulted in grooves smaller than semicircles with chords approximately 0.9" long. Due to the small size, all cells did not communicate with a groove.

EXAMPLE 4

A piece of "Cercor" corrugated ceramic, 4" x 4" x 2" thick, was obtained from Corning Glass Works, Corning, N.Y. The piece was made up of alternating corrugated and flat ceramic webs as described in U.S. Patent 3,112,184 forming about 20 cells/inch with the axes of the cells in the 2" direction. This piece was processed in the manner described in Example 3. The product was two pieces 4" x 4" x 0.95" thick with parallel semicircular grooves in one 4" x 4" face. Again, due to their small size, all cells did not communicate with a groove.

The invention claimed is:

1. A ceramic composite of a straight cell ceramic honeycomb structure in contact with a slant-cell ceramic honeycomb structure, the composite having between 50% and 90% open area in the surfaces in the honeycomb cells, and the surfaces in contact being planar and being penetrated by honeycomb cells, the cells of both structures having a nominal cell diameter of 1/32 inch to 2 inches and the walls defining said cells being 5 to 200 mils in thickness.

2. A composite as defined in claim 1 wherein the surface of the straight-cell honeycomb structure which is opposite to the surface in contact with the slant-cell honeycomb structure contains a series of parallel lateral grooves such that substantially all of the cells in the straight-cell honeycomb structure communicate with a groove.

3. A reactor for carrying out gas phase reactions comprising a generally cylindrical, vertically-placed vessel having an inlet opening in the upper portion, an outlet opening in the lower portion, a horizontally-placed divider located between the openings, the divider having a plurality of vertical channels for effluence of reacted gases, a chamber between the inlet opening and the divider, a horizontally-placed catalyst gauze pack supported ultimately by the divider and supported directly by at least one ceramic honeycomb structure as defined in claim 2, the gauze pack in contact with the surface of the ceramic honeycomb which is parallel to the surface having the series of grooves.

4. A reactor as defined in claim 3 characterized in that it is useful in a hydrogen cyanide reaction and the honeycomb cells have a nominal diameter of 3/16 inch and the walls defining said cells are 30 to 50 mils in thickness.

5. A reactor for carrying out gas phase reactions comprising a generally cylindrical, vertically-placed vessel having an inlet opening in the upper portion, an outlet opening in the lower portion, a horizontally-placed divider located between the openings, the divider having a plurality of vertical channels for effluence of reacted gases, a chamber between the inlet opening and the divider, a horizontally-placed catalyst gauze pack supported ultimately by the divider and supported directly by at least one straight-cell ceramic honeycomb structure having between 50 and 90% open area in the surfaces perpendicular to the longitudinal axes of the honeycomb cells, in which one surface perpendicular to the longitudinal axes of the honeycomb cells contains a series of parallel lateral grooves spaced apart such that substantially all of the cells in the structure communicate with a groove, said cells having a nominal cell diameter of 1/32 inch to 2 inches and the walls defining said cells being 5 to 200 mils in thickness, the gauze pack in contact with the surface of the ceramic honeycomb which is parallel to the surface having the series of grooves.

6. A reactor as defined in claim 5 characterized in that it is useful in a hydrogen cyanide reaction and the honeycomb cells have a nominal diameter of 3/16 inch and the walls defining said cells are 30 to 50 mils in thickness.

References Cited
UNITED STATES PATENTS

| | | | |
|---|---|---|---|
| 1,548,591 | 8/1925 | Firestone. | |
| 2,782,107 | 2/1957 | Inman | 23—288 |
| 2,843,592 | 7/1958 | Ludwig et al. | 23—288 |
| 2,899,286 | 8/1959 | Miller | 23—288 |
| 2,926,490 | 3/1960 | Eaton et al. | |
| 2,951,747 | 9/1960 | Vandaveer | 23—284 |
| 2,977,265 | 3/1961 | Forsberg et al. | |
| 3,006,798 | 10/1961 | Holland | 156—197 |
| 3,327,382 | 6/1967 | Keeleric | 29—455 X |
| 3,423,185 | 1/1969 | Ballard et al. | 23—288 |

JOSEPH SCOVRONEK, Primary Examiner

U.S. Cl. X.R.

161—68; 264—44, 45, 46; 106—39